March 3, 1964
J. C. SMITH ETAL
3,123,256
AUTOMATIC FILTER POWDER DISPENSER
Filed April 6, 1961
4 Sheets-Sheet 1
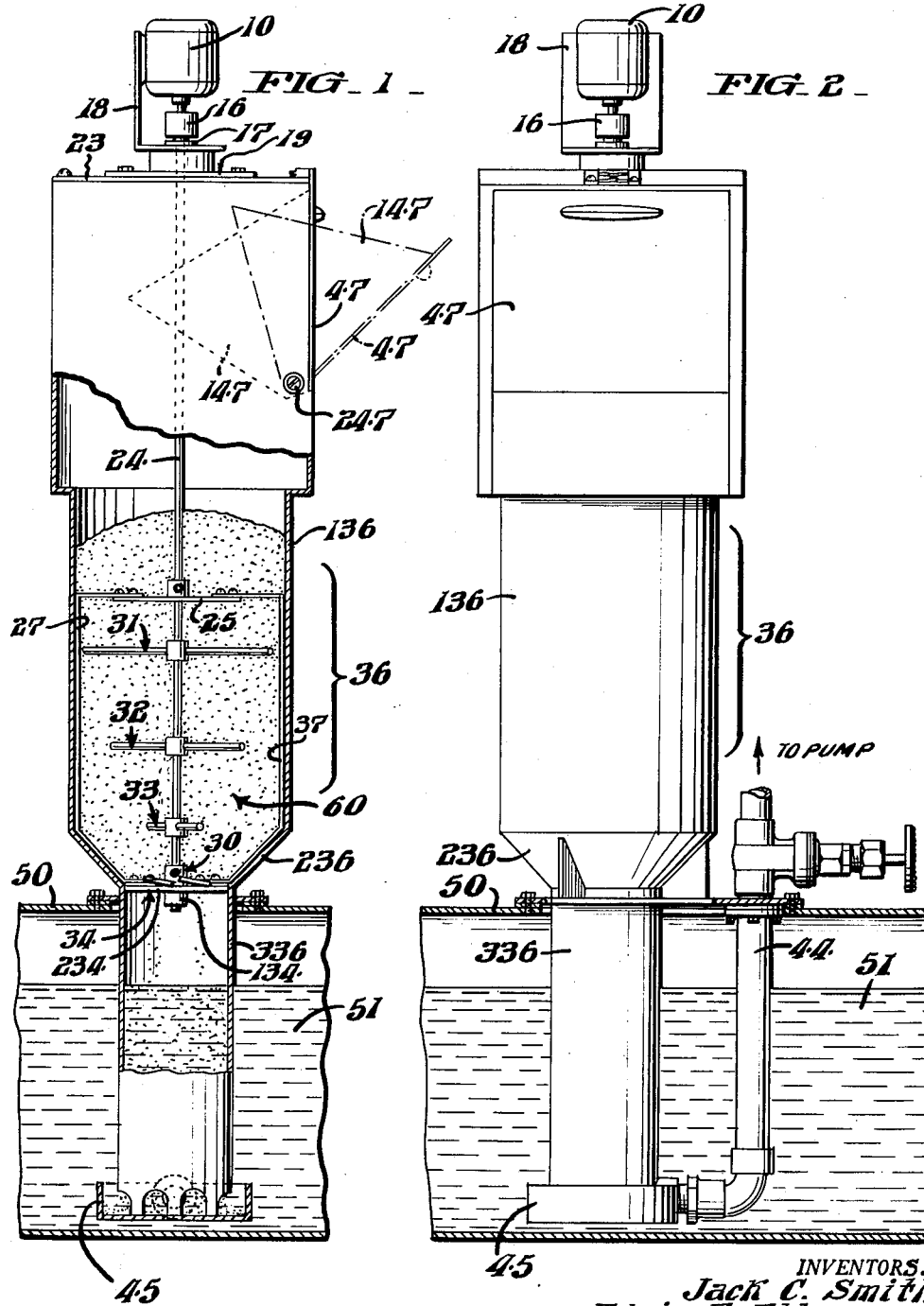
INVENTORS.
Jack C. Smith,
Edwin E. Etterman &
Roy T. Romine,
BY Paul & Paul
ATTORNEYS.

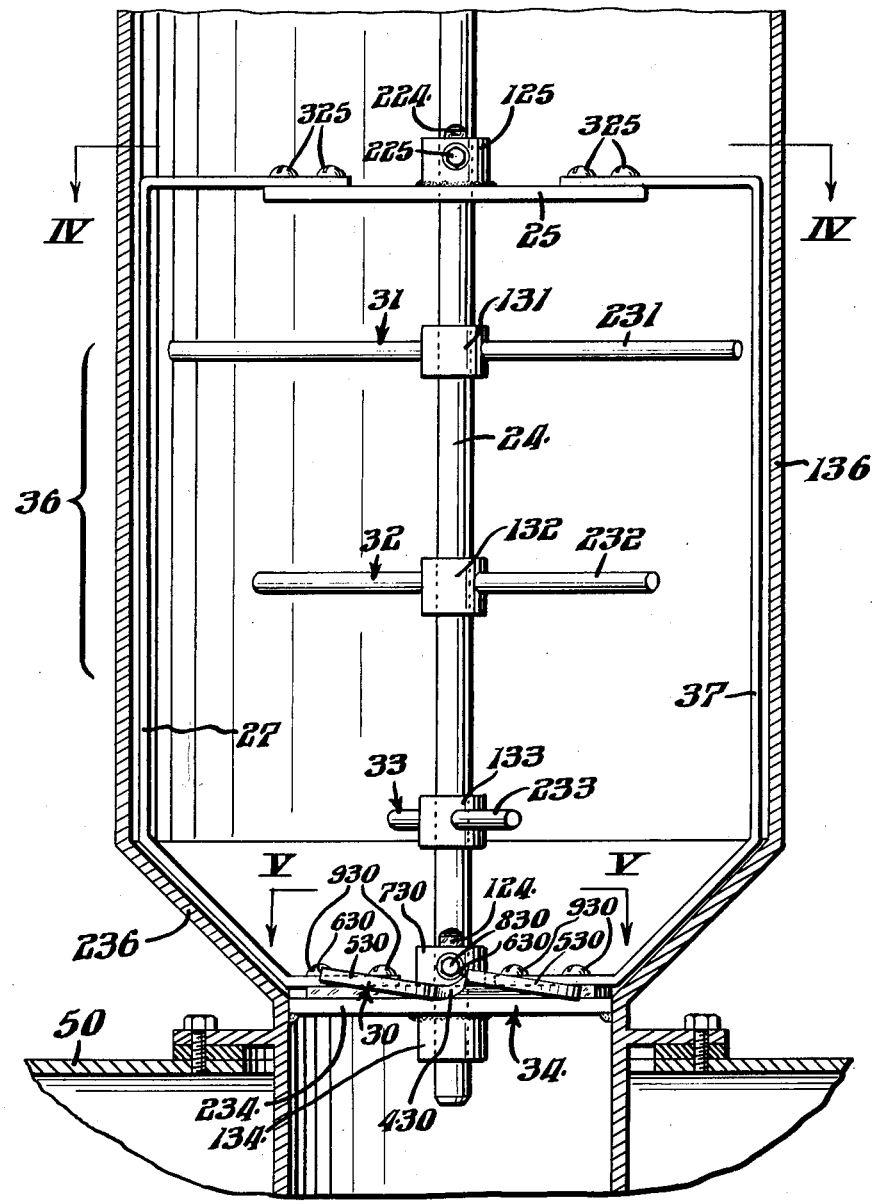

March 3, 1964     J. C. SMITH ETAL     3,123,256
AUTOMATIC FILTER POWDER DISPENSER
Filed April 6, 1961                    4 Sheets-Sheet 3
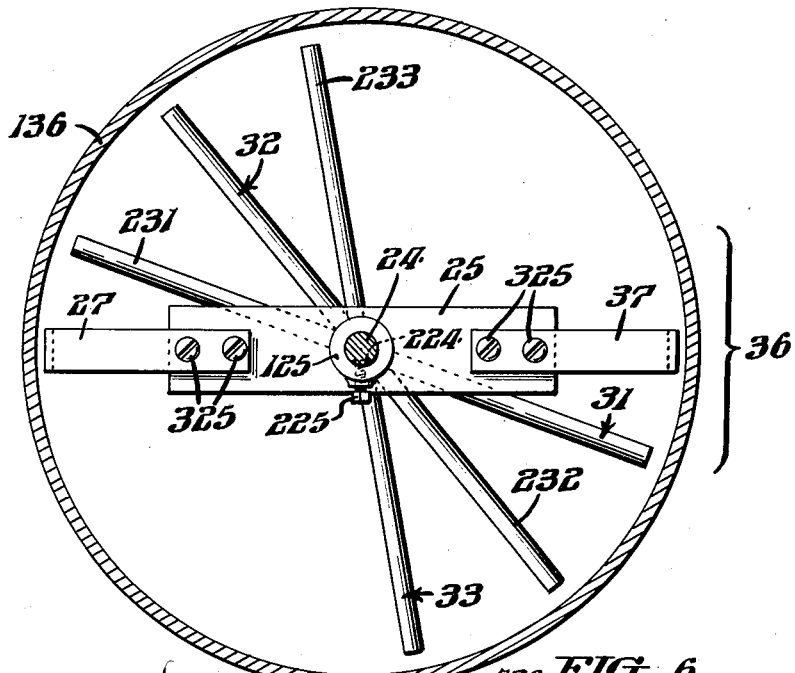
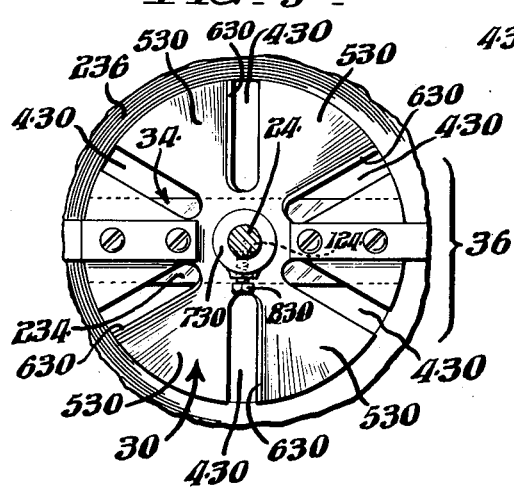
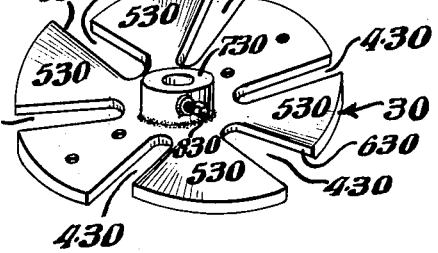
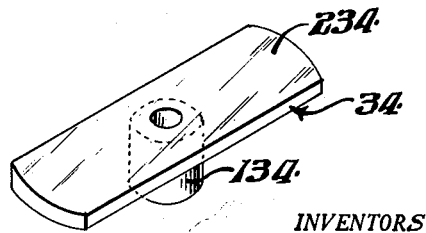
INVENTORS.
Jack C. Smith,
Edwin E. Etterman &
Roy T. Romine,
BY Paul & Paul
ATTORNEYS.

3,123,256
AUTOMATIC FILTER POWDER DISPENSER
Jack C. Smith, Edwin E. Etterman, and Roy T. Romine, Bowling Green, Ky., assignors to Detrex Chemical Industries, Inc., Detroit, Mich., a corporation of Michigan
Filed Apr. 6, 1961, Ser. No. 101,259
3 Claims. (Cl. 222—146)

This invention relates to means for feeding diatomaceous earth filter powder (or other powdered or granular material having tenacious qualities) in uniform or controlled quantities to a solvent or other liquid.

While not limited thereto, the invention is particularly useful in a cleaning system employing as the basis for the cleaning solution a non-aqueous synthetic solvent, such as perchlorethylene or other chlorinated hydrocarbon. As is known, the perchlorethylene or other chlorinated hydrocarbon solvent is relatively costly. Hence, it is the practice to clean the solvent by a suitable filtering process, thereby to make the solvent available for re-use. The filtering means customarily employed consists of a filtering septum of cloth or wire mesh on which is deposited a diatomaceous earth filter powder. The use of such filter powder has at least two advantages. First, it decreases the size of the solid soil particles which can pass through the filter. Second, it forms a loose base on which the solid soils are deposited during filtration forming a loose cake which is readily broken away from the cloth or wire mesh when the flow through the filter is reversed, thereby cleaning the filter. This process is usually referred to as back-washing.

As the cake of solid soils builds up on the wire or cloth mesh of the filter, resistance to the flow of solvent therethrough increases, and the flow rate decreases. For a fixed time period, with a decreasing flow rate, the garments, machine parts, or other materials being cleaned will of course be treated to a lesser quantity of solvent. Other things being equal, the cleaning effectiveness is directly related to the quality or cleanliness of the solvent and to the quantity of solvent passing through or by the material or articles being cleaned. Accordingly, to maintain consistent quality of cleaning, it is desirable that the cleanliness and flow rate of the solvent should remain substantially constant. This is believed to be best accomplished by employing a filter having a relatively small area which is back-washed at relatively frequent intervals. After each back-washing, a new supply of diatomaceous earth filter powder is added to the solvent. Also, if desired, small amounts of filter powder may be added at intervals during the cleaning or washing operation (as distinguished from the back-washing operation).

The object of the present invention is to provide means for automatically dispensing diatomaceous earth filter powder (or material having like characteristics) in uniform or controlled quantities to a synthetic solvent solution (or other liquid).

The achievement of the foregoing object is made difficult by the characteristics of diatomaceous earth filter powder. The size of the individual particles of the diatomaceous earth filter powder is very small. Each particle is porous, and the surface of each particle presents innumerable sharp edges. As a result of these physical properties, the particles have great tenacity for each other. They cling one to another and will not slide freely over each other.

Despite the above-described characteristics of diatomaceous earth filter powder, the filter powder dispenser of the present invention has the capability of automatically dispensing uniform or controlled amounts of powder.

The filter powder dispenser of our present invention will be best understood from the following detailed description of a preferred form illustrated in the drawing in which:

FIG. 1 is a side elevational view, partly in section, showing an automatic filter powder dispenser in accordance with the present invention;

FIG. 2 is a front elevational view of the dispenser of FIG. 1;

FIG. 3 is an enlarged view, in section, of a portion of the dispenser of FIG. 1;

FIG. 4 is a top view along the line IV—IV of FIG. 3 looking in the direction of the arrows;

FIG. 5 is a view along the line V—V of FIG. 3 looking in the direction of the arrows;

FIG. 6 is a perspective view of the agitator or cutting plate;

FIG. 7 is a perspective view of the lower bearing;

Figure 8:
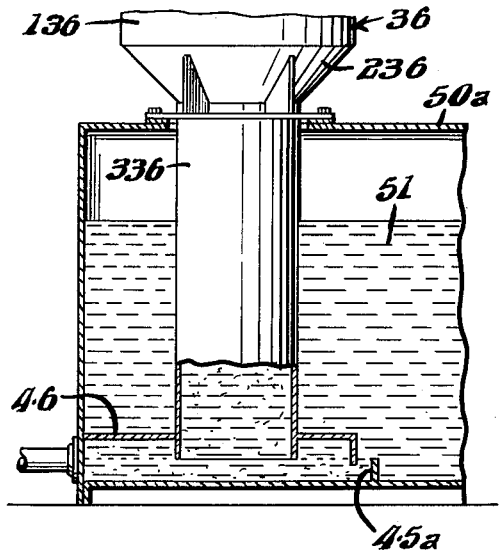
FIG. 8 is a view, partly in section, showing a modification in which the sump into which the filter powder is fed is a part of the tank.

In describing the preferred embodiment of the invention illustrated in the drawing, specific terminology has been resorted to for the sake of clarity. However, it is not the intention to be limited to the specific terms so selected, and it is to be understood that each specific term includes all technical equivalents which operate in a similar manner to accomplish a similar purpose.

Referring now to FIGS. 1 and 2, the automatic filter powder dispenser of the present invention is shown to comprise a vertically disposed housing 36 of generally cylindrical configuration comprising an upper section 136 (having a frusto-conical portion 236) and a lower section 336 of smaller diameter than upper section 136. Housing 36 is mounted, as by bolts or other suitable means, on the solvent storage tank 50 in vertical position, the lower portion of lower section 336 extending downwardly into the tank 50 and terminating in a sump 45.

A drive shaft 24 is supported by an upper bearing 17 and a lower bearing 34 in vertical position on the center axis of upper section 136 of housing 36. Drive shaft 24 is adapted to be driven rotationally, as by a motor 10 through a suitable coupling 16 (which may be either rigid or flexible). The motor assembly, comprising motor 10, coupling 16, bearing 17, bracket 18 and a support plate 19 are mounted on cover plate 23 of housing 36. By means of slotted holes in plates 19 and 23, the motor assembly is adjustable in any direction to a limited extent so that drive shaft 24 may be properly oriented with respect to the axis of housing 36.

Provided in the upper portion of upper section 136 is an access door 47 which opens outward about pivot point 247 to an angle of about 45° and which has side panels 147 so as to serve as a chute for delivering diatomaceous earth filter powder to the housing 36.

As seen most clearly in FIGS. 3 and 7, lower bearing 34 of drive shaft 24 may comprise a cylindrical bearing portion 134 secured, as by welding, to a supporting plate 234 which in turn may be secured, as by welding, to the wall of lower section 336 of housing 36.

Secured to the lower end of drive shaft 24, just above the bearing plate 234 is a generally disc-like agitator or cutting plate 30, the form of which is shown in perspective in FIG. 6.

As seen in FIG. 6, agitator or cutting plate 30 is provided with a plurality of radially-disposed notches or slots 430 of substantial depth and width, forming between the slots a plurality of sectors 530. One corresponding edge 630 of each sector is bent upwardly so that when the plate 30 is driven rotationally in a clockwise direction as viewed from above, the raised edges 630 form cutting blades or at least agitating blades.

Secured to the hub of plate 30, as by welding, is a cylindrical collar 730 having therein a set screw 830 adapted to be pressed against the flat surface 124 at the lower end of drive shaft 24, thereby to secure plate 30 firmly, but axially adjustable, on shaft 24.

Secured to agitator or cutting plate 30, as by screws 930, are a pair of opposed wiper arms 27 and 37. As seen best in FIG. 3, wiper arms 27 and 37 are shaped to extend outward from the plate 30 and then diagonally upward along the wall of the frusto-conical portion 236, then vertically upward along the wall of the lower portion of lower section 136 of housing 36. The upper extremities of wiper arms 27 and 37 then turn inwardly and are secured to a plate 25, as by screws 325. Plate 25 includes a collar 125, which may be secured thereto as by welding, having therein a set screw 225 which bears against a flat portion 224 of shaft 24. Thus, plate 25 is adjustable axially on shaft 24, and together with the axially adjustable agitator or cutting plate 30 provides clearance adjustment between the wiper arms 27, 37 and the wall of the frusto-conical portion 236 of housing 36.

As best seen in FIG. 3, secured to drive shaft 24, at spaced-apart locations between plate 25 and the agitator or cutting plate 30, are hub assemblies 31, 32 and 33, each of which comprises a collar, 131, 132, and 133, respectively, fixed to shaft 24 and rotatable therewith. Protruding radially from each of the collars 131, 132, 133 is a pair of opposed arms, 231, 232 and 233, respectively. As best seen in FIG. 4, each pair of arms 231, 232, and 233, occupies a different diametrical plane of housing 36. The diametrical planes occupied by the pairs of opposed radial arms 231, 232 and 233 may also preferably be different from the diametrical plane occupied by the opposed wiper arms 27 and 37.

In operation, the upper section 136 of housing 36, above the agitator or cutting plate 30, is filled or at least partially filled with diatomaceous earth filter powder which is delivered through the open door 47 serving as a fill chute. When it is desired to feed powder to the solvent 51 in tank 50, the motor 10 is energized and the drive shaft 24 is driven rotationally through the coupling 16. As previously indicated, the drive shaft 24 is driven rotationally in such direction that the raised edges 630 of the sectors 530 of the agitator or cutting plate 30 become the leading edges. Thus, in the particular embodiment shown, the agitator plate 30 is driven in a clockwise direction by the shaft 24.

When drive shaft 24 and agitator or cutting plate 30 are driven rotationally, wiper arms 27 and 37, and hub assemblies 31, 32 and 33, are also driven rotationally, the paddle arms and the hub assemblies being secured to drive shaft 24, as previously described.

The rotation of all of these parts (the agitator or cutting plate 30, the wiper arms 27, 37, and the opposed pairs of hub-assembly arms 231, 232 and 233, which, for convenience will be referred to herein as the rotatable feed parts) causes filter powder to feed through the slots 430 of the plate 30 and to drop into the solvent 51 in the lower section 336. The feeding of powder through the slots 430 is due to the difference in the rotational speeds of the mass 60 of filter powder and that of the rotatable feed parts, above identified.

Before the rotatable feed parts are first rotated, after having been stopped, the mass 60 of filter powder in housing 36 is in column form, each particle tending to cling to adjoining particles and also to the wall of housing 36. (It will be understood that, except for the narrow vertical strips of wall space occupied by the arms 27 and 37, the powder in the housing 36 is in contact with the wall of the housing.) As a result, the column of powder resists rotation. While such resistance is due primarily to the substantial amount of powder in contact with the wall of the housing 36, it is also due to the inherent resistance to motion of a body at rest. In any event, when the motor 10 is energized and the drive shaft 24 starts to rotate, the rotational movement of the mass 60 of filter powder lags behind that of the rotatable feed parts comprising the agitator or cutting plate 30, the wiper arms 27, 37, and the pairs of hub-assembly arms 231, 232 and 233. As a consequence, the raised leading edges 630 of the agitator or cutting plate 30 tend to shear off, or at least agitate, the filter powder which is in contact with or immediately above the plate 30. In addition, the pairs of opposed hub-assembly arms 231, 232 and 233 move through the mass 60 of filter powder in three spaced-apart horizontal planes. The effect is to break up the column of powder, to prevent packing, and thereby to maintain the powder in a uniform broken-up condition within the lower-section 136 of housing 36.

After drive shaft 24 and wiper arms 27, 37 have completed one-half of a revolution, the continued rotation of the paddle arms close to the surface of the wall of housing 136 prevents the powder from adhering to the wall, but the rotational movement of the mass of powder never attains the speed of rotation of the rotatable feed parts. Thus, the raised edges 630 of agitator plate 30, and also the hub assembly arms 231, 232, 233 continue to move relative to the powder and in so doing prevent packing thereof. This has the effect of maintaining a uniform contact pressure of the powder on the plate 30.

Stated another way, the rotation of wiper arms 27 and 37, combined with the rotation of the hub-assembly arms 231, 232 and 233, prevents the filter powder from bridging from wall to wall across the housing 136, and prevents packing, thus assuring a substantially uniform supply of filter powder in contact with plate 30. Agitator or cutting plate 30, together with hub-assembly arms 231, 232 and 233, prevent the powder from rotating as a mass or unit column within the housing. By agitating and breaking up the mass of powder, these parts prevent packing and cause a substantially uniform contact pressure of filter powder on plate 30. The total result is to feed a uniform supply of powder to solvent 51 for a given rotational speed of drive shaft 24.

After passing through the slots 430 in plate 30, the powder falls into the solvent (or other liquid) 51 where it forms a slurry which is sucked by a pump (not shown) up through the conduit 44 shown in FIG. 2.

Figure 9:
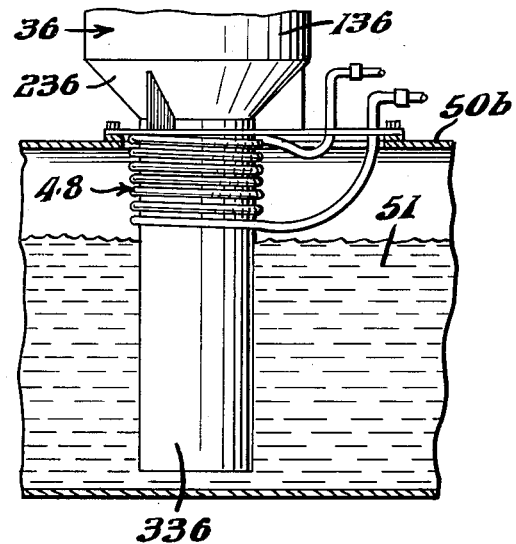
FIG. 9 shows a modification in which a cooling coil is added for preventing condensate from reaching and dampening the powder in the dispenser housing.

As shown in FIG. 8, a sump 45a may be built on the floor of tank 50a beneath the lower section 336 of housing 36 to receive the filter powder. The top of sump 45a may be partially closed by a baffle 46 to prevent dispersion of the powder away from the pump suction.

Where the solvent or other liquid 51 is hot, vapors tend to form above the liquid which tend to condense on the walls of the housing 36. Such condensing vapors could cause wetting of the powder in the upper section 136 and cause packing thereof. To prevent such a condition from occurring, a cooling coil 48 may be placed around the upper portion of lower section 336 of housing 36, as shown in FIG. 9. The coil 48 reduces the temperature of that portion of section 336 which is in contact with coil 48 and causes any vapors which are formed above the liquid 51 to condense on the walls of section 336 in contact with the coil 48, thereby preventing the vapors from rising to the upper portion of the housing 36, and thereby preventing wetting of the powder above agitator plate 30.

It will be seen that the filter powder dispenser shown and described is adapted to feed a uniform quantity of filter powder to the liquid solvent 51 for each revolution of agitator plate 30. To increase the quantity of powder dispensed per revolution of agitator plate 30, the leading edges 630 of the sectors 530 of plate 30 may be bent upwards to an increased extent thereby increasing the amount of powder which is sheared off or agitated for each revolution.

While the preferred embodiment of this invention has been described in some detail, it will be obvious to one skilled in the art that various modifications may be made

Having thus described our invention, we claim:

1. Apparatus for dispensing automatically diatomaceous earth filter powder into a cleaning solution contained in a supply tank, said cleaning solution employing as a basis a non-aqueous synthetic solvent, said dispensing apparatus comprising; an elongated cylindrical vertically-disposed walled housing mounted on said tank, said housing including an upper section and a lower section, said lower section extending downward into said tank, said upper section having an access opening for receiving a supply of diatomaceous earth filter powder the particles of which tend to cling together to form a cohesive mass in said housing; a shaft extending axially through said upper section and adapted to be driven rotationally; an agitator plate secured to the lower end of said shaft and adapted to be driven rotationally when said shaft is rotated, said agitator plate forming the floor of said upper section of said housing and supporting said diatomaceous earth filter powder, said agitator plate having therein radially-disposed slots forming sectors the corresponding edges of which are raised upwards to form a cutting or agitating blade; a pair of opposed upwardly-extending wiper arms secured to said agitator plate and adapted to sweep along the wall of a lower portion of said upper section when said shaft is rotated; a plurality of pairs of opposed break-up arms of substantial vertical thickness fixed to and extending radially from said shaft at a plurality of different angular orientations at spaced-apart locations above said agitator plate and adapted to move rotationally through said filter powder on a corresponding plurality of horizontal planes when said shaft is rotated, the rotation of said agitator plate, wiper arms and spaced radial break-up arms causing said mass of diatomaceous earth filter powder to break up and the particles thereof to drop through the radial slots of said agitator plate and into said lower section of said housing, and a cooling coil surrounding the upper portion of the lower section of said housing for condensing on the wall of said lower section any vapors which may arise from the solvent in said tank.

2. Apparatus for dispensing automatically into a cleaning liquid contained within a supply tank powdered material the particles of which have a strong tendency to cling to one another, said dispensing apparatus comprising; an elongated cylindrical vertically-disposed walled housing mounted on the tank containing said cleaning liquid, said housing including an upper section and a lower section, said lower section extending downward into said tank, said upper section having an access opening for receiving a supply of said powdered material the particles of which tend to cling together to form a cohesive mass in said housing; a shaft extending axially through said upper section and adapted to be driven rotationally; an agitator plate attached to the lower end of said shaft and adapted to be driven rotationally when said shaft is rotated, said agitator plate forming the floor of said upper section of said housing for supporting said powdered material, said agitator plate having therein radially-disposed slots forming sectors the corresponding edges of which are raised upwards to form a cutting or agitating blade; a pair of opposed upwardly-extending wiper arms secured to said shaft and adapted to sweep along the wall of a lower portion of said upper section when said shaft is rotated; a plurality of break-up arms of substantially vertical thickness fixed to and extending radially from said shaft at a plurality of different angular orientations at spaced-apart locations above said agitator plate and adapted to move rotationally through said filter powder on a plurality of horizontal planes when said shaft is rotated, the rotation of said agitator plate, wiper arms and spaced radial break-up arms causing said mass of powdered material to break up and the particles thereof to drop through the radial slots of said agitator plate and into said lower section of said housing; and a cooling coil surrounding the portion of the lower section of said housing for condensing on the wall of said lower section any vapors which may arise from the liquid in said tank.

3. Apparatus for dispensing automatically powdered material the particles of which have a strong tendency to cling to one another, said dispensing apparatus comprising: an elongated cylindrical vertically-disposed walled housing, including an upper section and a lower section, said upper section being adapted to receive a supply of powdered material the particles of which tend to cling together to form a cohesive mass in said housing; a shaft extending axially through said upper section and fixed against movement in the axial direction but adapted to be driven rotationally; an agitator plate attached to the lower end of said shaft and adapted to be driven rotationally when said shaft is rotated, said agitator plate forming the floor of said upper section of said housing for supporting said powdered material, said agitator plate having therein radially disposed slots forming sectors the corresponding leading edges of which are raised upwards to form a cutting or agitating blade; a pair of narrow opposed outwardly and upwardly extending wiper arms secured to said shaft and adapted when said shaft is rotated to sweep along the wall of the lower zone of said upper section of said housing; a plurality of linear radial breakup arms affixed to and extending radially from said shaft within said zone at a plurality of angular orientations different from that of said wiper arms, each radial breakup arm being adapted when said shaft is rotated to move rotationally through said filter powder within a single horizontal plane within said zone, the rotation of said agitator plate wiper arms and radial breakup arms being adapted to break up said mass of powdered material and to cause powdered material to flow through the radial slots of said agitator plate and into said lower section of said housing in substantially uniform quantities for each revolution of said agitator plate, wiper arms and radial breakup arms.

References Cited in the file of this patent

UNITED STATES PATENTS

| | | |
|---|---|---|
| 1,152,820 | Kennicott | Sept. 7, 1915 |
| 1,253,218 | Doremus | Jan. 15, 1918 |
| 1,272,726 | Thompson | July 16, 1918 |
| 1,282,081 | Helbing | Oct. 22, 1918 |
| 1,291,759 | Bunnell | Jan. 21, 1919 |
| 1,799,755 | Loushridge | Apr. 7, 1931 |
| 2,503,878 | Linn | Apr. 11, 1950 |
| 2,540,540 | Murphy | Feb. 6, 1951 |

FOREIGN PATENTS

| | | |
|---|---|---|
| 897,925 | France | June 12, 1944 |